(12) United States Patent
Barton

(10) Patent No.: US 8,645,989 B2
(45) Date of Patent: Feb. 4, 2014

(54) METHOD FOR ENHANCING DIGITAL VIDEO RECORDER TELEVISION ADVERTISING VIEWERSHIP

(75) Inventor: James M. Barton, Los Gatos, CA (US)

(73) Assignee: TiVo Inc., Alviso, CA (US)

( * ) Notice: Subject to any disclaimer, the term of this patent is extended or adjusted under 35 U.S.C. 154(b) by 808 days.

(21) Appl. No.: 12/539,505

(22) Filed: Aug. 11, 2009

(65) Prior Publication Data

US 2009/0297122 A1 Dec. 3, 2009

Related U.S. Application Data

(63) Continuation of application No. 09/740,618, filed on Dec. 18, 2000, now Pat. No. 7,779,437.

(60) Provisional application No. 60/171,829, filed on Dec. 21, 1999.

(51) Int. Cl.
*H04N 7/10* (2006.01)
*H04N 5/445* (2011.01)
*H04N 9/80* (2006.01)

(52) U.S. Cl.
USPC ............................... 725/32; 725/40; 386/249

(58) Field of Classification Search
USPC ....................... 725/32, 40; 386/249
See application file for complete search history.

(56) References Cited

U.S. PATENT DOCUMENTS

| 5,371,551 | A | * | 12/1994 | Logan et al. | 348/571 |
| 5,696,866 | A | * | 12/1997 | Iggulden et al. | 386/249 |
| 5,812,732 | A | * | 9/1998 | Dettmer et al. | 386/250 |
| 5,911,029 | A | * | 6/1999 | Sakaguchi et al. | 386/239 |
| 5,957,695 | A | * | 9/1999 | Redford et al. | 434/307 R |
| 5,974,218 | A |   | 10/1999 | Nagasaka et al. | |
| 5,987,210 | A | * | 11/1999 | Iggulden et al. | 386/239 |
| 5,999,688 | A | * | 12/1999 | Iggulden et al. | 386/343 |

(Continued)

FOREIGN PATENT DOCUMENTS

| JP | 1996-123821 | 5/1996 |
| JP | 1998-512420 | 11/1998 |
| JP | 1998-336590 | 12/1998 |
| WO | WO 99/38321 | 7/1999 |

OTHER PUBLICATIONS

Chinese Office Action received in International application No. 200480033609.3 dated Sep. 29, 2010 (18 pages).

(Continued)

*Primary Examiner* — James R Sheleheda
(74) *Attorney, Agent, or Firm* — Hickman Palermo Truong Becker Bingham Wong LLP; Kirk D. Wong

(57) ABSTRACT

A method for enhancing digital video recorder television advertising viewership provides a method wherein the first or last number of seconds of a commercial break are carefully authored to provide a "teaser" to entice the viewer to watch multiple commercials during the commercial break instead of skipping the commercial break using the fast forward or jump functions of the DVR. A bookending function displays an advertisement before and/or after a program that has been recorded on the DVR's storage device is played to the viewer. The viewer selects a recorded program from the DVR's storage device to playback. Before the program is played back, an advertisement is retrieved from the storage device and is displayed before the program is run. Another advertisement is retrieved and then played after the program is over.

18 Claims, 9 Drawing Sheets

(56) References Cited

U.S. PATENT DOCUMENTS

| | | | | |
|---|---|---|---|---|
| 6,072,982 | A * | 6/2000 | Haddad | 725/93 |
| 6,100,941 | A * | 8/2000 | Dimitrova et al. | 348/700 |
| 6,249,863 | B1 * | 6/2001 | Redford et al. | 713/1 |
| 6,262,951 | B1 * | 7/2001 | Shimizu et al. | 369/30.1 |
| 6,404,977 | B1 * | 6/2002 | Iggulden | 386/248 |
| 6,473,903 | B2 * | 10/2002 | Balakrishnan et al. | 725/135 |
| 6,496,981 | B1 * | 12/2002 | Wistendahl et al. | 725/112 |
| 6,788,882 | B1 * | 9/2004 | Geer et al. | 386/243 |
| 6,909,837 | B1 * | 6/2005 | Unger | 386/343 |
| 7,110,658 | B1 * | 9/2006 | Iggulden et al. | 386/241 |
| 7,155,451 | B1 * | 12/2006 | Torres | 1/1 |
| 7,159,232 | B1 * | 1/2007 | Blackketter et al. | 725/38 |
| 7,225,142 | B1 * | 5/2007 | Apte et al. | 705/14.39 |
| 7,269,330 | B1 * | 9/2007 | Iggulden | 386/248 |
| 7,395,546 | B1 * | 7/2008 | Asmussen | 725/34 |
| 7,818,763 | B2 * | 10/2010 | Sie et al. | 725/32 |
| 7,877,766 | B1 * | 1/2011 | Wu et al. | 725/22 |
| 2002/0048349 | A1 * | 4/2002 | Bixler et al. | 379/67.1 |
| 2002/0057893 | A1 * | 5/2002 | Wood et al. | 386/46 |
| 2003/0014747 | A1 | 1/2003 | Spehr | |
| 2003/0053540 | A1 | 3/2003 | Wang et al. | |
| 2004/0125761 | A1 | 7/2004 | Yamaguchi et al. | |
| 2006/0013556 | A1 * | 1/2006 | Poslinski | 386/46 |
| 2010/0280876 | A1 * | 11/2010 | Bowra | 705/10 |
| 2011/0116766 | A1 * | 5/2011 | Sie et al. | 386/251 |

OTHER PUBLICATIONS

Chinese Final Office received in International application No. 200480033609.3 dated Aug. 31, 2010 (10 pages).
Chinese Current Claims in International application No. 200480033609.3 dated Sep. 2010 (7 pages).
Japanese Patent Office, "Official Notice for Preliminary Rejections (English translation)", Japan app No. 2001-547844, dated Apr. 16, 2010, 3 pages.
Current Claims, Japan app No. 2001-547844, 14 pages.
U.S. Appl. No. 10/958,897, filed Oct. 4, 2004, Final Office Action, mailed Jul. 16, 2013.

* cited by examiner

METHOD FOR ENHANCING DIGITAL VIDEO RECORDER TELEVISION ADVERTISING VIEWERSHIP

CROSS-REFERENCE TO RELATED APPLICATIONS; PRIORITY CLAIM

This application claims benefit as a Continuation of application Ser. No. 09/740,618 filed Dec. 18, 2000, which claims benefit of Provisional Application 60/171,829, filed Dec. 21, 1999, the entire contents of both of which are hereby incorporated by reference as if fully set forth herein, under 35 U.S.C. §120.

TECHNICAL FIELD

The invention relates to the storing and viewing of television program material in a computer environment. More particularly, the invention relates to increasing the visibility of television advertisements in a computer environment.

BACKGROUND

The introduction of Digital Video Recorders (DVR) have revolutionized the television recording industry. DVRs store program material onto a storage medium that is easily accessible, reusable, and the recording does not degrade over time as with video tapes.

DVRs give the viewer an unprecedented amount of control over how the viewer watches live and recorded television programs. One of the effects of the DVRs is that as viewers watch television programs stored on the DVR's storage medium, they have a tendency to skip over the commercial breaks.

Television broadcasters and advertisers have a negative viewpoint of the advent of the DVR. The feeling is that the DVR is destroying any purpose of advertising on the broadcast medium. Primetime no longer exists because viewers are not tied to the broadcaster's schedule. DVRs allow the viewer to easily store all of his desired programs for later viewing.

Broadcasters generate their revenue through the value of the commercial spots. Advertisers feel that they are losing their potential viewership "eyes." If advertisers do not believe that there is any value in a primetime commercial spot, then the broadcasters lose large proportions of their revenue.

On the other hand, DVR service providers also generate revenue through commercials. There is an extremely large potential market for specialized advertising that is shown directly to the target audience. DVRs have the ability to evaluate the viewer's viewing preferences and make inferences as to the viewer's lifestyle. With this personal information the DVR service providers can directly target the correct audience for advertisers.

It would be advantageous to provide a method for enhancing digital video recorder television advertising viewership that allows broadcasters to retain and improve the value of a certain portion of television commercial breaks. It would further be advantageous to provide a method for enhancing digital video recorder television advertising viewership that allows DVR service providers to present advertisements to viewers that do not usurp the broadcaster's advertising space.

SUMMARY

The invention provides a method for enhancing digital video recorder television advertising viewership. The system allows the broadcaster to retain and improve the value of a certain segment of television commercial breaks. In addition, the invention provides a system that allows the Digital Video Recorder (DVR) service provider to present advertisements to viewers that do not usurp the broadcaster's advertising space.

A client device, typified in application Ser. No. 09/126, 071, owned by the Applicant, provides functionality typically associated with the present generation of DVRs, such as the storage of a large amount of video content, ability to choose and play this content on demand, and full "VCR-like" control of the delivery of the content.

The invention provides a method wherein the first or last number of seconds of a commercial break are carefully authored to provide a "teaser" to entice the viewer to watch multiple commercials during the commercial break instead of skipping the commercial break using the fast forward or jump functions of the DVR. This teaser can be a set of images or logos that indicate a commercial relating to that advertiser is present or a menu or short sequence of animations to designed catch the viewer's attention and persuade him to watch the commercial break.

Further, advertisers can also place the more important content in the first or last number of seconds of their commercials. This content will get the desired message across to the viewer in those seconds.

The invention also provides a bookending function that displays an advertisement before and/or after a program that has been recorded on the DVR's storage device is played to the viewer. The viewer selects a recorded program from the DVR's storage device to playback. Before the program is played back, an advertisement is retrieved from the storage device and is displayed before the program is run. Another advertisement is retrieved and then played after the program is over.

The invention's bookending allows any ad material that is loaded onto the system to be displayed before and/or after any program material. Since the DVR system knows the viewer's program preferences (e.g., science fiction, police dramas) and, possibly, the viewer's personal information (e.g., male, age 27, likes photography), ads can be selected based on this information and targeted to the specific audience that the viewer is a part of.

Other aspects and advantages of the invention will become apparent from the following detailed description in combination with the accompanying drawings, illustrating, by way of example, the principles of the invention.

DETAILED DESCRIPTION

The invention is embodied in a method for enhancing digital video recorder television advertising viewership in a computer environment. A system according to the invention allows the broadcaster to retain and improve the value of a certain segment of television commercial breaks. In addition, the invention provides a system that allows the Digital Video Recorder (DVR) service provider to present advertisements to viewers that do not usurp the broadcaster's advertising space.

Figure 1:
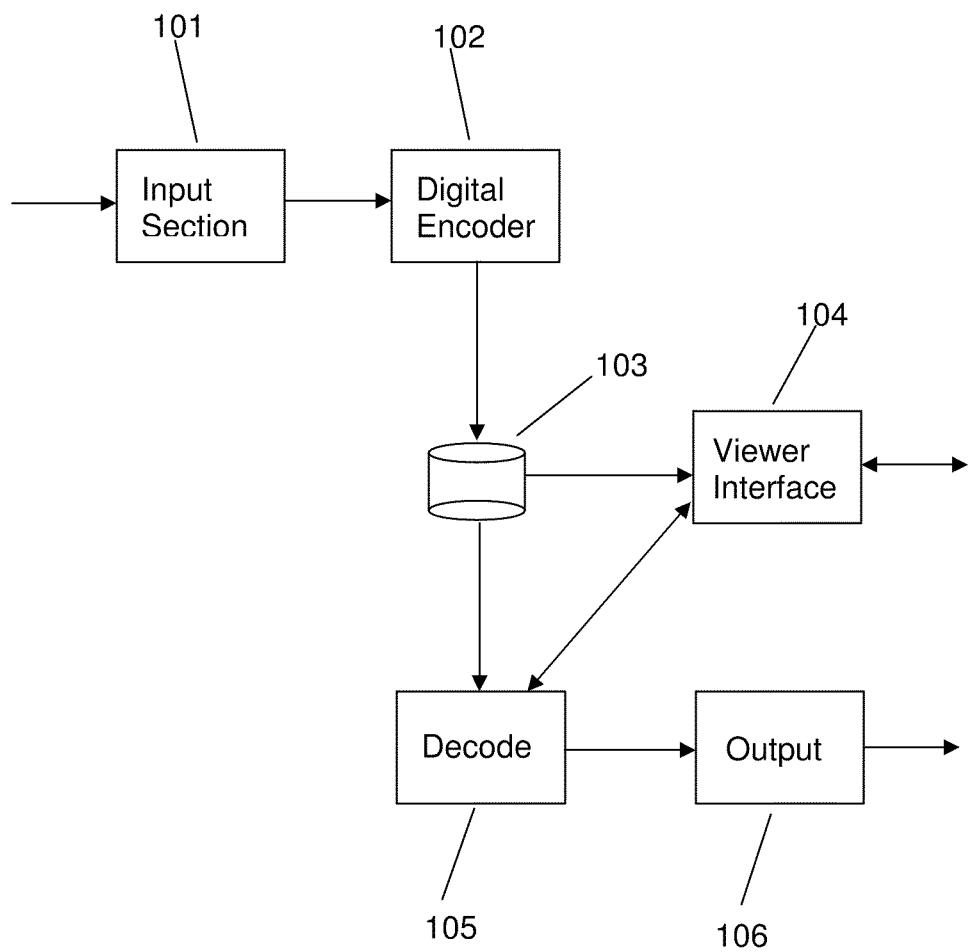
FIG. 1 is a block schematic diagram of a preferred embodiment of a digital video recording system according to the invention.

Referring to FIG. 1, time-shifting devices, or DVRs, take as input television broadcast signals from multiple signal sources. One such method is described in application Ser. No. 09/126,071 entitled "Multimedia Time Warping System" owned by the Applicant. The input Section 101 selects the input source and directs the signal to the Digital Encoder 102. If the signal source is analog, the Digital Encoder 102 converts the analog signal to a digital form, e.g., MPEG2. For digital signals such as digital satellite feeds, the Digital Encoder 102 can directly store the digital signal or convert the digital signal to a different sample rate.

Digital signals are stored on a persistent storage device 103, e.g., a magnetic hard disk or RAM device. Multiple programs are stored on the storage device 103 and are easily accessed by the viewer. The viewer selects the desired program stored on the storage device 103 through the Viewer Interface 104.

The selected program is accessed from the storage device 103 and decoded into analog form for presentation onto a television set by the Decode module 105. If the display is a digital monitor, for example, the Decode module 105 converts the stored program into the proper digital format. The Output module 106 presents the Decode module's 105 output into an acceptable signal format (analog or digital) to the viewer's television or monitor.

Figure 2:
FIG. 2 is a diagram of a screenshot of a user interface menu listing recorded programs according to the invention.
Figure 3:
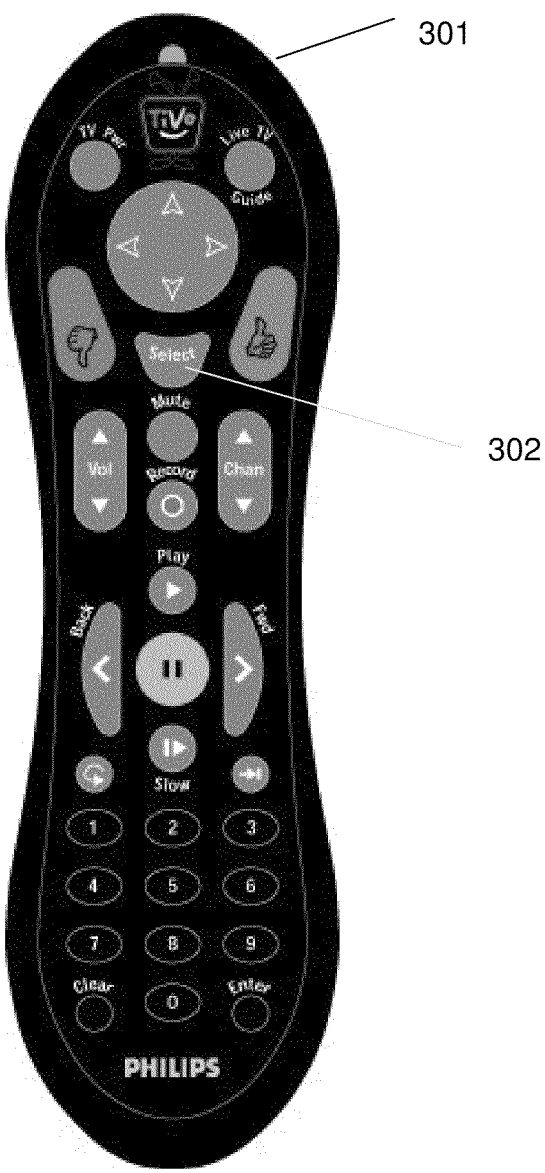
FIG. 3 is a diagram of an exemplary remote input device according to the invention.

With respect to FIGS. 2 and 3, the invention presents the viewer with a list 201 of the programs stored on the storage device. The viewer highlights the desired program using a remote input device 301. The program is then selected when the viewer presses the select button 302. Each program is randomly accessible, a program may be viewed and deleted irrespective of its recorded sequence. This is unlike video cassette tapes that do not give the viewer the convenience of easily accessing a particular recorded program on a tape or inserting new recordings amidst a populated tape.

Figure 4:
FIG. 4 is a diagram of a screenshot of a program playback mode according to the invention.

Referring to FIG. 4, DVRs allow the viewer to perform many trick play functions 401 on the program being viewed. The viewer can fast forward and rewind at multiple speeds, pause, single step, slow play, etc. through the program material.

The invention of time-shifting devices for television programs has also created the opportunity for television viewers to fast-forward through commercial advertisements if the viewer is watching a recorded program, or a live, cached program where the current viewing position is delayed from the current real-time television broadcast.

Since there is little economic incentive for viewers to watch commercials in those cases, the value of the space made available for advertising drops precipitously. However, in examining the behavior of viewers, it is apparent that a newly valuable advertising space has been created at the beginning or ending of a commercial break.

Figure 5:
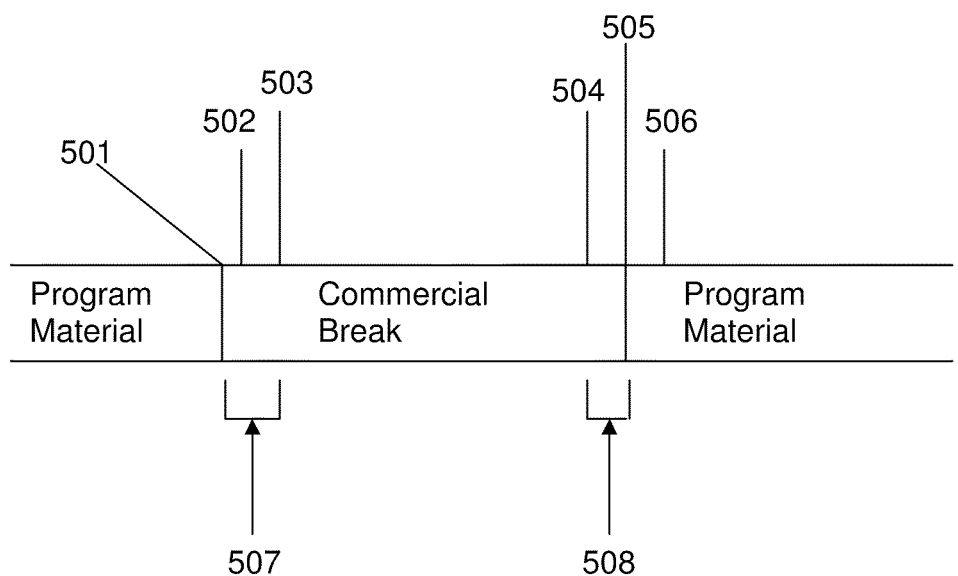
FIG. 5 is a block schematic diagram showing a viewer's response to a commercial break within a program according to the invention.

With respect to FIG. 5, a preferred embodiment of the invention provides a method for enhancing the viewership of television ads on a DVR by taking into account the viewer's interaction with the inherent operation of the DVR. Whether the technique is a visual fast-forward (TiVo) or fixed-time (e.g., 30 seconds) skip function (ReplayTV), there is a delay from when the viewer realizes 502 that the program material has ended and advertising has begun 501, and when the viewer starts skipping the commercial using the remote input device 503. Several factors are involved in the viewer's response time. The viewer must first recognize 502 that the program material has ended 501. Once the viewer realizes that the event has occurred, he must then press a button 503 on the remote input device.

Often, the time span 507 from the end of the program 501 to the point where the viewer has pressed the button 503 is tens of seconds long. Thus, the first few seconds of any commercial break become extremely valuable as an opportunity to get the viewer to NOT skip the commercial break. Advertisers will pay additional money for the opportunity to occupy this space in the commercial breaks.

Similarly, when fast-forwarding or skipping, it is typical that the viewer will not be able to precisely skip to the beginning of the program material 505. When examining viewer behavior, most viewers will skip forward 506, then back up 504 into the preceding commercial break a few seconds in order to view all of the program material from the point where it starts 505. Therefore, the last few seconds of a commercial break 508 become extremely valuable, since it is an opportunity to persuade the viewer to rewind into the commercial break and view advertisements.

Figure 6:
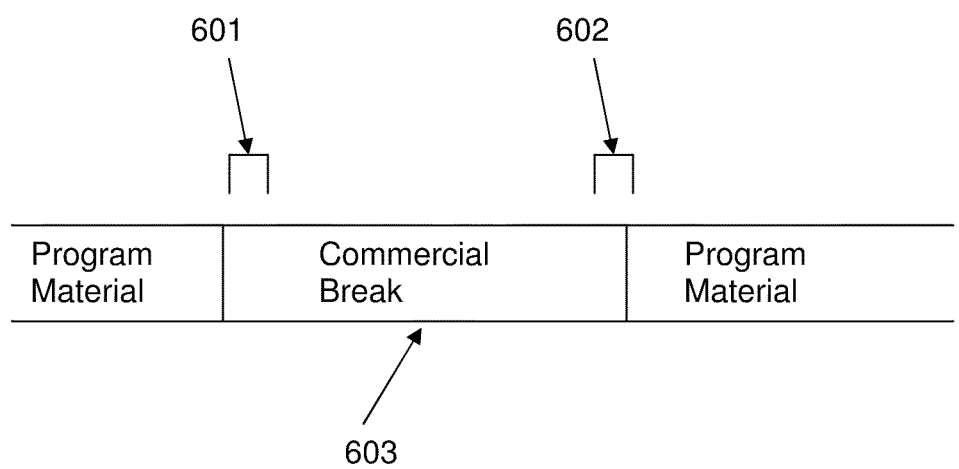
FIG. 6 is a block schematic diagram showing the important portions of a commercial break according to the invention.

Referring to FIG. 6, the invention provides a method wherein the first few seconds 601 or last few 602, are carefully authored to provide a "teaser" to entice the viewer to watch multiple commercials during the break 603. This teaser might be a set of images or logos that indicate a commercial relating to that advertiser is present or a menu or short sequence of animations to designed catch the viewer's attention and persuade him to watch the commercial break.

Figure 7:
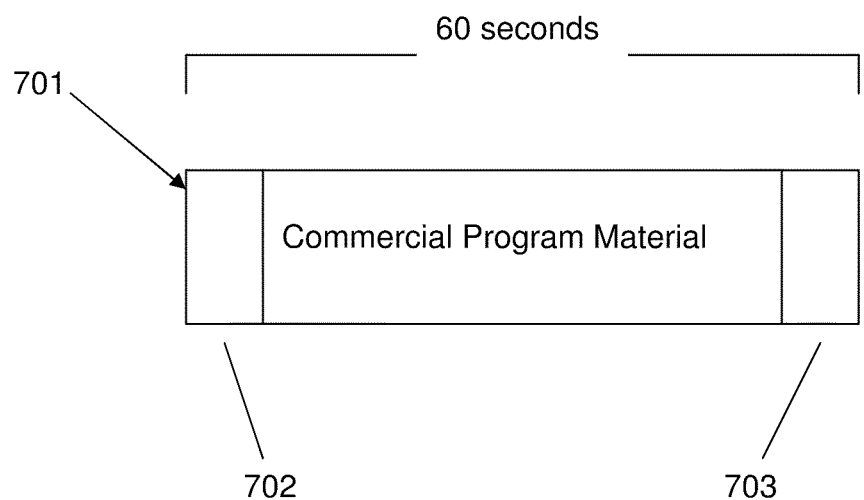
FIG. 7 is a block schematic diagram showing the important portions of a commercial according to the invention.

With respect to FIG. 7, advertisers can also place the more important content in the first 702 or last 703 number of seconds of their commercials 701. This content will be able to get the desired message across to the viewer in those seconds. Given this model, content providers are able to charge advertisers a higher rate to place their commercials at the beginning or the end of a commercial break.

Further, one can imagine using the CC tagging technology as described in application Ser. No. 09/665,921 entitled "Closed Caption Tagging System" owned by the Applicant, or similar technology such as ATVEF or Wink, to automatically pause the program being watched immediately at the beginning (or end) of the commercial break, with the frame being displayed containing a menu of the advertisements in the commercial break. The viewer might simply skip forward, or choose a particular commercial via a menu-like overlay on top of the broadcast image using the on screen display (OSD).

Another method used is described in application Ser. No. 09/187,967 entitled "Analog Video Tagging and Encoding System." The network content provider authors an invisible tag at the beginning of the "pod" (the sequence of ad avails) that tells a decoder (such as TiVo's Time Warping System) what all the commercials in the pod are, thereby allowing the decoder to display an instant menu of ads.

Further, it is possible using the CC tagging technology, or similar techniques, to cause an "auto-pause" capability. For example, instead of presenting a menu, a short "teaser" image or multi-frame video could introduce an advertisement, and then automatically pause. The viewer might hit "play" to watch the advertisement or fast-forward to skip to the next advertisement, which would present a similar teaser and then pause. With a just few button presses, the viewer could skip the commercial break and start the program, or watch one or more advertisements in the break.

As noted above, the invention stores program material on a storage medium. A viewer accesses the programs through a user menu. The viewer selects the desired program by highlighting the appropriate program and pressing the select button. Once the program is selected, it is then displayed.

Figure 8:
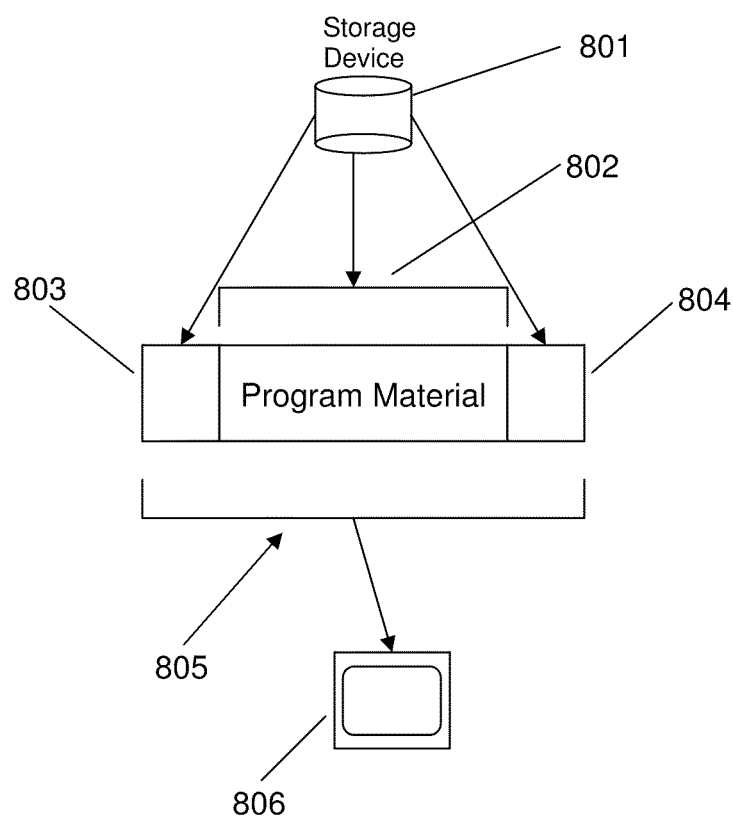
FIG. 8 is a block schematic diagram of a preferred embodiment of the invention showing the bookending concept according to the invention.

Referring to FIG. 8, "bookending" concerns the display of the program material 802. The program 802 is indexed and retrieved from the Storage Device 801. Before the program 802 is displayed an ad 803 is first displayed before the program is run. Another ad 804 is then played after the program is over. The invention's bookending allows any ad material that is loaded onto the system to be displayed before and/or after any program material. The ads and program material 805 are displayed to the viewer 806.

The ads are stored on the Storage Device 801, indexed and, optionally, stored along with the characteristics of each ad. The choice is up to the DVR system or provider as to whether an ad is played before, after, or both before and after any program material.

Figure 9:
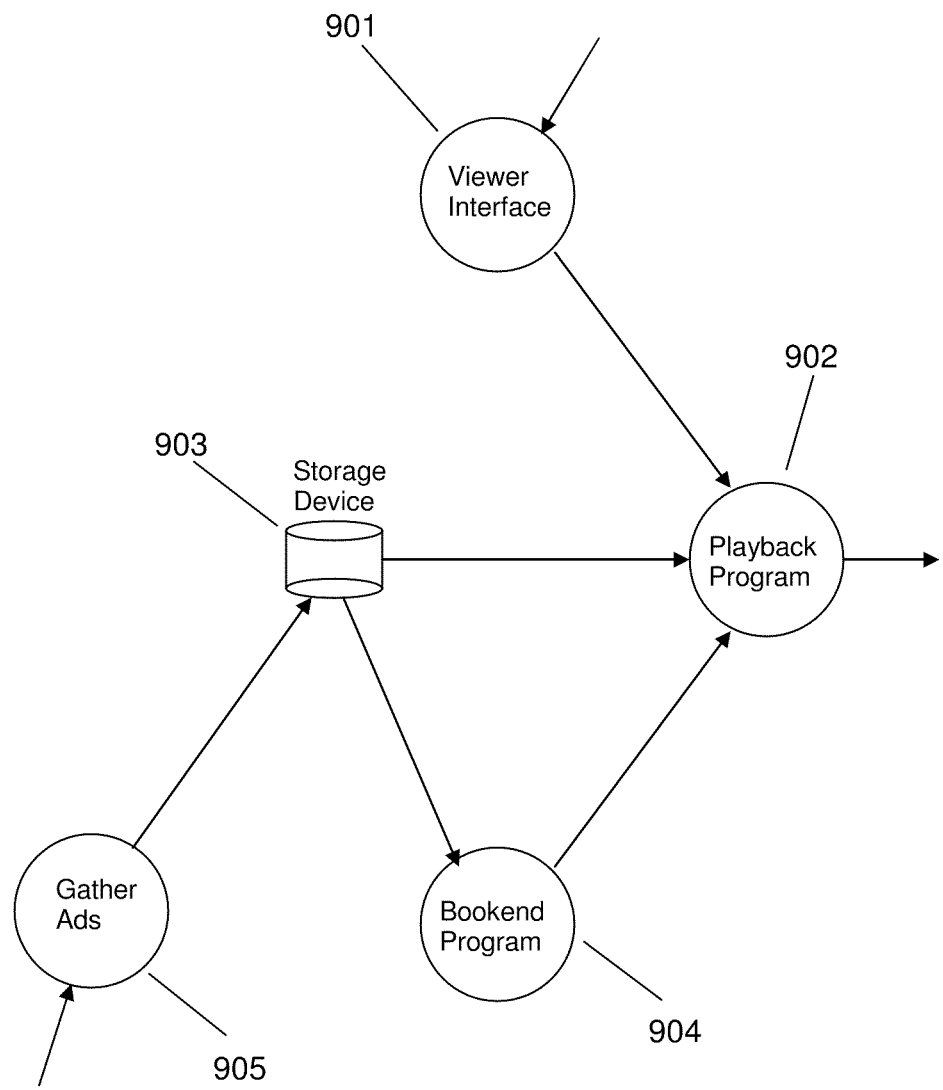
FIG. 9 is a block schematic diagram of high level task viewpoint of a preferred embodiment of the invention implementing the bookending function according to the invention.

With respect to FIG. 9, the invention stores program material and ads on the storage device 903. The Viewer Interface module 901 displays the list of stored programs to the viewer and accepts the viewer program selections. The Playback Program module 902 finds and extract the selected program from the Storage Device 903.

Bookending ads are selected by the Bookend Program module 904. The Bookend Program module 904 decides whether to display an ad before and/or after the program material—configurable by the DVR service provider. Each ad is selected from the Storage Device 903 by the Bookend Program module 904.

The Playback Program module 902 makes a request to the Bookend Program module 904 for an ad to display. The request is made before and after the Playback Program module 902 displays the program material. If an ad is passed to the Playback Program module 902 by the Bookend Program module 904, then it is displayed. Otherwise, the Playback Program module 902 continues on without displaying an ad.

Since the DVR system knows the viewer's program preferences (e.g., science fiction, police dramas) and, possibly, the viewer's personal information (e.g., male, age 27, likes photography), ads can be selected by the Bookend Program module 904 based on this information. The Bookend Program module 904 selects ads targeted to the specific audience that the viewer is a part of. This allows the DVR service provider to charge advertisers for targeted advertising which is much more valuable than shotgun advertising that occurs in normal television commercial breaks.

Ads are downloaded onto the Storage Device 903 via a modem, Ethernet, recorded at a predetermined time from an input source, etc. by the Download Ads module 905. The DVR can request ads from a central server or record certain groups of ads for the viewer's target audience.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for enhancing viewership of television, comprising:
   receiving, by a digital video recorder (DVR), a program segment containing a beginning portion of a commercial at a beginning of a commercial break;
   during playback of the program segment;
      identifying an in-band tag in the program segment, the in-band tag including information that identifies commercials in the commercial break, and
      displaying the beginning portion of the commercial contained in the program segment;
   based, at least in part, on information from the in-band tag in the program segment, automatically pausing playing of the program segment, by the DVR, after displaying the beginning portion of the commercial; and
   in response to a command from a viewer, performing, at the DVR, at least one of:
      playing the remainder of the commercial; and
      skipping the remainder of the commercial.

2. The method of claim 1 further comprising:
   in response to a command from the viewer to skip the remainder of the commercial, displaying a beginning portion of a second commercial contained in the program segment;
   pausing playing of the program segment after displaying the beginning portion of the second commercial.

3. The method of claim 2 further comprising:
   in response to a second command from the viewer, performing, at the DVR, at least one of:
      playing the remainder of the second commercial; and
      skipping the remainder of the second commercial.

4. The method of claim 1, wherein a beginning portion of a commercial introduces the commercial.

5. An apparatus, comprising:
   one or more processors;
   a receiving subsystem in a digital video recorder (DVR) that receives a program segment containing a beginning portion of a commercial at a beginning of a commercial break;
   the one or more processors identify, during playback of the program segment, an in-band tag in the program segment, the in-band tag including information that identifies commercials in the commercial break;
   a displaying subsystem that displays, during playback of the program segment, the beginning portion of the commercial contained in the program segment;
   the one or more processors automatically pause, based, at least in part, on information from the in-band tag in the program segment, playing of the program segment after displaying the beginning portion of the commercial; and
   the one or more processors, responsive to a command from a viewer, perform at least one of:
      playing the remainder of the commercial; and
      skipping the remainder of the commercial.

6. The apparatus of claim 5 further comprising:
   the displaying subsystem displays, responsive to a command from the viewer to skip the remainder of the commercial, a beginning portion of a second commercial contained in the program segment;
   the one or more processors pause playing of the program segment after displaying the beginning portion of the second commercial.

7. The apparatus of claim 6 further comprising:

the one or more processors perform, responsive to a second command from the viewer, at least one of:
playing the remainder of the second commercial; and
skipping the remainder of the second commercial.

8. The apparatus of claim 5, wherein a beginning portion of a commercial introduces the commercial.

9. A non-transitory computer-readable medium storing one or more sequences of instructions which, when executed by one or more processors, causes the one or more processors perform the steps of:
receiving, by a digital video recorder (DVR), a program segment containing a beginning portion of a commercial at a beginning of a commercial break;
during playback of the program segment:
identifying an in-band tag in the program segment, the in-band tag including information that identifies commercials in the commercial break, and
displaying the beginning portion of the commercial contained in the program segment;
based, at least in part, on information from the in-band tag in the program segment, automatically pausing playing of the program segment, by the DVR, after displaying the beginning portion of the commercial; and
in response to a command from a viewer, performing, at the DVR, at least one of:
playing the remainder of the commercial; and
skipping the remainder of the commercial.

10. The non-transitory computer-readable medium of claim 9 further comprising:
in response to a command from the viewer to skip the remainder of the commercial, displaying a beginning portion of a second commercial contained in the program segment;
pausing playing of the program segment after displaying the beginning portion of the second commercial.

11. The non-transitory computer-readable medium of claim 10 further comprising:
in response to a second command from the viewer, performing, at the DVR, at least one of:
playing the remainder of the second commercial; and
skipping the remainder of the second commercial.

12. The non-transitory computer-readable medium of claim 9, wherein a beginning portion of a commercial introduces the commercial.

13. A method for enhancing viewership of television advertisements, comprising:
receiving, by a digital video recorder (DVR), a program segment containing a commercial break that includes a plurality of commercials, at least one commercial of the plurality of commercials having a corresponding introductory portion that immediately precedes, in the program segment, the at least one commercial;
the content of an introductory portion relating to the content of a corresponding commercial;
the introductory portion comprising a multi-frame video that introduces the corresponding commercial;
identifying the plurality of commercials from information included in an in-band tag in the program segment;
during playback of the program segment, displaying a first introductory portion associated with a first commercial of the plurality of commercials identified from information included in the in-band tag;
pausing playing of the program segment after displaying the first introductory portion;
subsequent to pausing playing the program segment, displaying a second introductory portion associated with a second commercial of the plurality of commercials identified from information included in the in-band tag; and
pausing playing of the program segment after displaying the second introductory portion.

14. The method of claim 13, further comprising performing, at the DVR in response to a command from a viewer, at least one of:
playing the second commercial associated with the second introductory portion; and
skipping the second commercial associated with the second introductory portion.

15. An apparatus, comprising:
one or more processors;
a receiving subsystem in a digital video recorder (DVR) that receives a program segment containing a commercial break that includes a plurality of commercials, at least one commercial of the plurality of commercials having a corresponding introductory portion that immediately precedes, in the program segment, the at least one commercial;
the content of an introductory portion relating to the content of a corresponding commercial;
the introductory portion comprising a multi-frame video that introduces the corresponding commercial;
the one or more processors identify the plurality of commercials from information included in an in-band tag in the program segment;
a displaying subsystem that displays, during playback of the program segment, a first introductory portion associated with a first commercial of the plurality of commercials identified from information included in the in-band tag;
the one or more processors pause playing of the program segment after displaying the first introductory portion;
the displaying subsystem displays, subsequent to pausing playing the program segment, a second introductory portion associated with a second commercial of the plurality of commercials identified from information included in the in-band tag; and
the one or more processors pause playing of the program segment after displaying the second introductory portion.

16. The apparatus of claim 15, further comprising the one or more processors perform, in response to a command from a viewer, at least one of:
playing the second commercial associated with the second introductory portion; and
skipping the second commercial associated with the second introductory portion.

17. A non-transitory computer-readable medium storing one or more sequences of instructions which, when executed by one or more processors, causes the one or more processors perform the steps of:
receiving, by a digital video recorder (DVR), a program segment containing a commercial break that includes a plurality of commercials, at least one commercial of the plurality of commercials having a corresponding introductory portion that immediately precedes, in the program segment, the at least one commercial;
the content of an introductory portion relating to the content of a corresponding commercial;
the introductory portion comprising a multi-frame video that introduces the corresponding commercial;
identifying the plurality of commercials from information included in an in-band tag in the program segment;
during playback of the program segment, displaying a first introductory portion associated with a first commercial of the plurality of commercials identified from information included in the in-band tag;

pausing playing of the program segment after displaying the first introductory portion;

subsequent to pausing playing the program segment, displaying a second introductory portion associated with a second commercial of the plurality of commercials identified from information included in the in-band tag; and pausing playing of the program segment after displaying the second introductory portion.

18. The non-transitory computer-readable medium of claim 17, further comprising performing, at the DVR in response to a command from a viewer, at least one of:

playing the second commercial associated with the second introductory portion; and skipping the second commercial associated with the second introductory portion.

* * * * *